US005103786A

United States Patent [19]
Suzuki et al.

[11] Patent Number: 5,103,786
[45] Date of Patent: Apr. 14, 1992

[54] SLIDING EXHAUST BRAKE SYSTEM

[75] Inventors: Ryoichi Suzuki, Mishima; Kazunori Takikawa, Numazu, both of Japan

[73] Assignee: Usui Kokusai Sangyo Kaisha Ltd., Japan

[21] Appl. No.: 644,887

[22] Filed: Jan. 23, 1991

[30] Foreign Application Priority Data

Jan. 29, 1990 [JP] Japan .................................. 2-18190

[51] Int. Cl.[5] .......................... F02D 9/06; F16K 3/02

[52] U.S. Cl. .............................. 123/323; 137/630.12; 188/273; 251/326

[58] Field of Search .................. 123/323; 137/630.12; 188/273; 251/326

[56] References Cited

U.S. PATENT DOCUMENTS

| | | | |
|---|---|---|---|
| 742,308 | 10/1903 | Gerrard | 137/184 |
| 795,057 | 7/1905 | O'Brien | 137/629 |
| 1,436,412 | 11/1922 | Skiffington | 137/629 |
| 1,620,100 | 3/1927 | Hoxton | 188/273 |
| 2,845,306 | 7/1958 | Carver | 239/128 |
| 3,342,203 | 9/1967 | Abercrombie | 137/155 |
| 3,720,227 | 3/1973 | Curran | 137/339 |
| 4,054,156 | 10/1977 | Benson | 137/630.12 |
| 4,062,332 | 12/1977 | Perr | 188/273 |
| 4,093,046 | 6/1978 | Perr | 188/273 |
| 4,205,704 | 6/1980 | Benson | 137/630.12 |
| 4,408,627 | 10/1983 | Harris | 137/242 |
| 4,452,269 | 6/1984 | Kindermann | 137/338 |
| 4,553,648 | 11/1985 | Suzuki et al. | 188/273 |
| 4,615,354 | 10/1986 | Bianchi | 137/110 |
| 4,643,226 | 2/1987 | Bälz | 137/625.33 |
| 4,671,489 | 6/1987 | Jankovic | 251/327 |
| 4,685,544 | 8/1987 | Takigawa et al. | 188/273 |
| 4,733,687 | 3/1988 | Takigawa et al. | 137/338 |
| 4,751,987 | 6/1988 | Takigawa et al. | 188/273 |
| 4,773,440 | 9/1988 | Yanagawa et al. | 137/242 |
| 4,848,523 | 7/1989 | Suzuki | 188/273 |
| 4,858,734 | 8/1989 | Suzuki | 188/273 |
| 4,886,148 | 12/1989 | Suzuki | 188/273 |
| 4,901,827 | 2/1990 | Suzuki | 188/273 |
| 4,903,733 | 2/1990 | Suzuki | 137/630.12 |
| 4,917,221 | 4/1990 | Takikawa et al. | 188/273 |

FOREIGN PATENT DOCUMENTS

| | | |
|---|---|---|
| 3009453 | 9/1981 | Fed. Rep. of Germany . |
| 2223602 | 10/1974 | France . |
| 55-117047 | 9/1980 | Japan . |
| 55-119926 | 9/1980 | Japan . |
| 55-123328 | 9/1980 | Japan . |
| 55-123330 | 9/1980 | Japan . |
| 60-3437 | 1/1985 | Japan . |
| 44095 | 3/1916 | Sweden . |
| 4311 | of 1818 | United Kingdom . |
| 14098 | of 1891 | United Kingdom . |
| 1378497 | 12/1974 | United Kingdom . |

*Primary Examiner*—Tony M. Argenbright
*Attorney, Agent, or Firm*—Anthony J. Casella; Gerald E. Hespos

[57] ABSTRACT

There is disclosed an improved sliding exhaust brake system installed on a large vehicle. The brake system comprises a housing, an exhaust gas passage, a main valve member taking the form of a flat plate, an exhaust pressure-adjusting hole formed in the main valve member, a block member fixed to the front end of a piston rod, and a piston valve mechanism for opening and closing the exhaust pressure-adjusting hole. When the passage is closed by the main valve member, it is pushed in one direction by the front end of the piston rod. When the passage is opened, the block member engages the main valve member to move it in the opposite direction. The piston valve mechanism is biased forward by a spring.

4 Claims, 4 Drawing Sheets

PRIOR ART

SLIDING EXHAUST BRAKE SYSTEM

BACKGROUND OF THE INVENTION

1. Field of the Invention

The present invention generally relates to a sliding exhaust brake system which is connected to the exhaust pipe of a large-sized vehicle such as a truck or bus and closes off the exhaust gas discharge passage in the exhaust pipe to brake the vehicle when it goes down a steep hill. More particularly, the invention relates to improvements in the structure of the sliding exhaust brake system.

2. Description of the Prior Art

A conventional valve mechanism used in an exhaust brake system of this kind is shown in FIG. 3, where a valve member 23 takes the form of a flat plate and is provided with an exhaust pressure-adjusting hole 24 in its bottom wall. The valve member 23 is mounted in a housing 21 forming the body of the exhaust brake system. An auxiliary valve member 30 consists of a liner 29 sliding on the surface of the valve member 30 together with a support frame 28 over which the liner 29 fits. The frame 28 is mounted to the front end of a piston rod 26 via a block member 25. The valve member 23 engages the rod 26 which extends through the partition wall of an actuator such as a cylinder device 22 or a diaphragm device connected with the body of the brake system. The exhaust gas passage is closed off after the exhaust pressure-adjusting hole 24 is closed by the auxiliary valve member 30. The passage is opened after the adjusting hole 24 is opened.

In recent years, the output powers of internal combustion engines of automobiles have been increased more and more, and an increasing number of engines are supercharged. That is, engines have tended to be rotated at higher speeds. Therefore, the present situation is that the exhaust pressure and the amount of exhaust gas tend to be increased. With the conventional mechanism described above, however, since the exhaust pressure increases, the obtained smoothness, especially responsiveness, tends to be insufficient especially when the exhaust passage is closed. In particular, in order to close off the passage, the exhaust pressure-adjusting hole 24 is first closed by the auxiliary valve member 30. Under this condition, the valve member 23 is moved to close off the exhaust passage. As a result, the aforementioned undesirable phenomena tend to occur. To avoid these problems, the actuator has had to be made larger.

SUMMARY OF THE INVENTION

It is an object of the invention to provide a sliding exhaust brake system which, when the exhaust gas passage should be closed, closes it while suppressing the rate of the exhaust pressure increase and which closes the exhaust pressure-adjusting hole immediately after the passage is closed off, whereby the gas passage can be sufficiently smoothly and quickly closed with good response even to high exhaust pressure and to large amounts of exhaust gas without the need to make the actuator larger and without deteriorating the braking function.

The above object is achieved by a sliding exhaust brake system having an exhaust gas passage and comprising: a housing forming the body of the exhaust brake system and having connecting protruding walls at its both ends, the protruding walls being connected with an exhaust pipe, the housing being provided with a path extending substantially at right angles to the exhaust gas passage; a main valve member taking the form of a flat plate, the valve member being capable of moving back and forth in said path, the valve member being provided with an exhaust pressure-adjusting hole, the valve member being mounted in the housing in such a way that the valve member engages a piston rod extending through the partition wall of an air cylinder device connected with the upper end of said path; a block member engaged by the valve member and fixed to the front end of the piston rod which pushes the valve member in one direction when the exhaust gas passage is closed by the main valve member and which is engaged by the block member to move the main valve member in the opposite direction when the passage is opened; an exhaust pressure-adjusting hole or a separate second exhaust pressure-adjusting hole formed at the front end of the main valve member; an abutting rod having a front end portion extending outwardly through the peripheral wall of the main valve member located near its front end; a piston valve mechanism that opens and closes the exhaust pressure-adjusting hole or the separate second exhaust pressure-adjusting hole, the piston valve mechanism being mounted to the base of the abutting rod; and a spring biasing the piston valve mechanism forward.

In one embodiment of the invention, an auxiliary valve member is held to the front end of the block member. When the exhaust gas passage is closed by the main valve member, the exhaust pressure-adjusting hole is closed by the auxiliary valve member. When the passage is opened, the adjusting hole is opened by the auxiliary valve member. At the same time, the block member is brought into engagement with the main valve member.

In this novel structure, when the exhaust gas passage is closed off by the main valve member, the piston valve mechanism opens the exhaust pressure-adjusting hole or the separate second exhaust pressure-adjusting hole. Under this condition, the piston valve mechanism cooperates with the main valve member to close the passage. Meanwhile, some of the exhaust gas is released from the exhaust pressure-adjusting hole to suppress increases in the exhaust pressure. The protruding abutting rod abuts against the bottom wall of the housing to completely close off the passage. In synchronism with this closure, the piston valve mechanism moves rearward to close the exhaust pressure-adjusting hole.

Consequently, the exhaust gas passage can be closed sufficiently smoothly and with good response without requiring a large-sized and powerful actuator such as a cylinder device or diaphragm device driving the valve mechanism or making the assembly large.

When the passage is opened, the structure functions similarly to the prior art structure.

DETAILED DESCRIPTION OF THE PREFERRED EMBODIMENTS

Figure 1A:
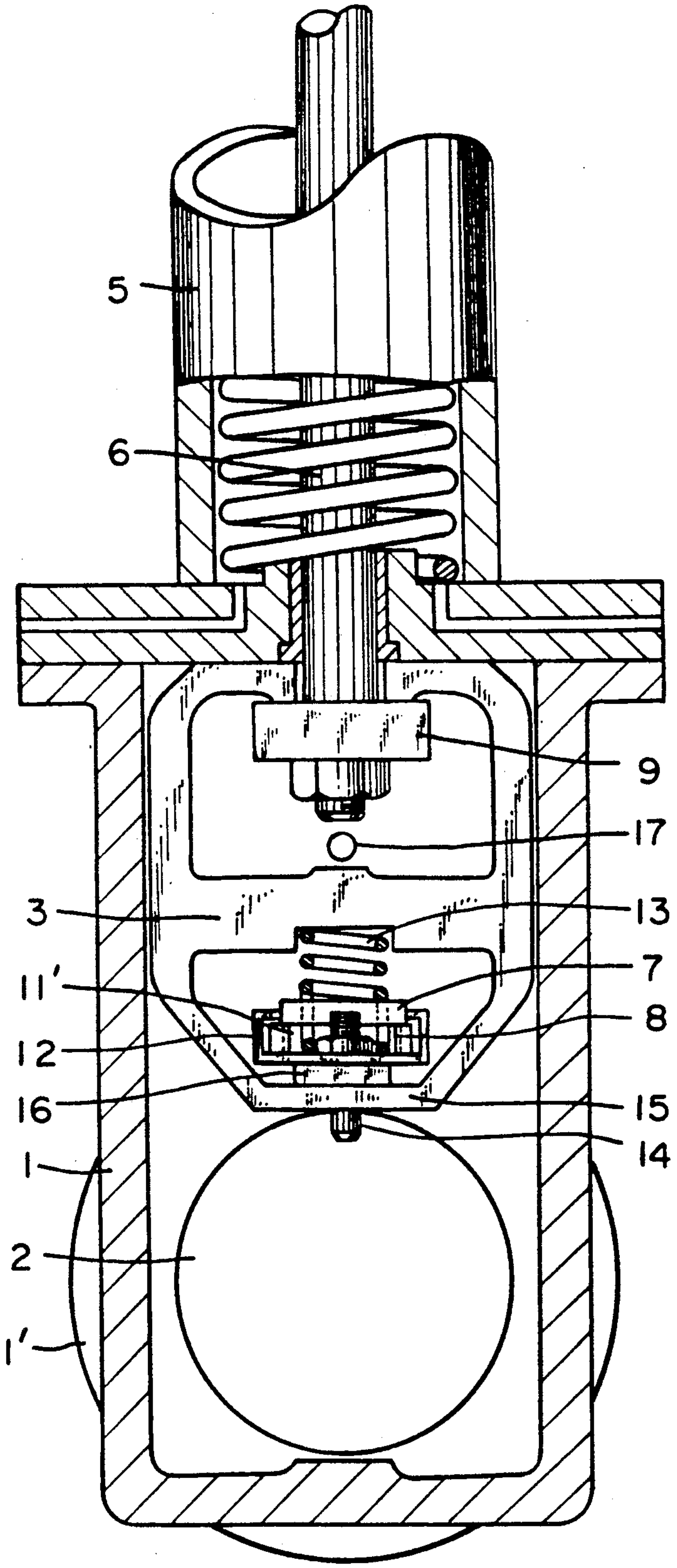
FIG. 1A is a partially cutaway plan view of a sliding exhaust brake system according to the invention.
Figure 1B:
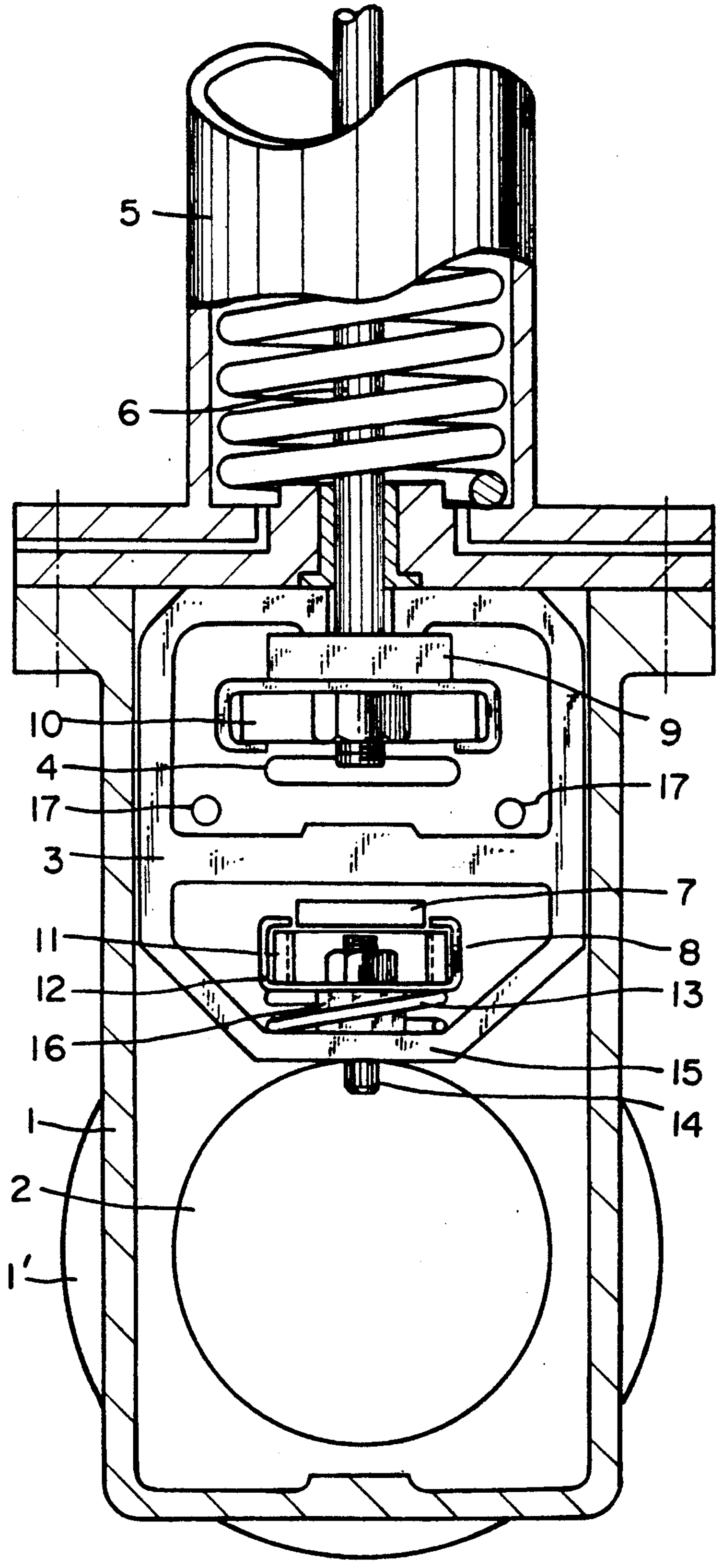
FIG. 1B is a view similar to FIG. 1A, but showing another sliding exhaust brake system according to the invention.
Figure 2:
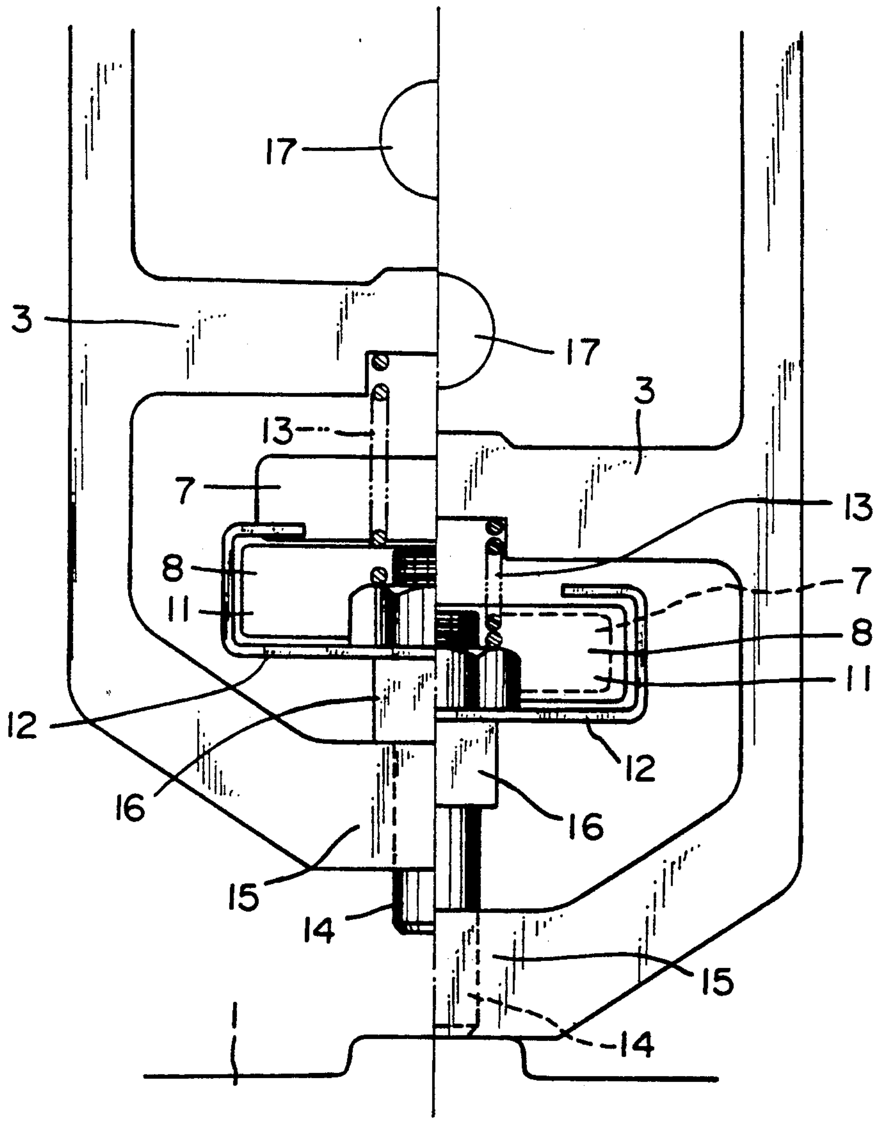
FIG. 2 is a partially cutaway plan view of main portions of the brake systems shown in FIGS. 1A and 1B.
Figure 3:
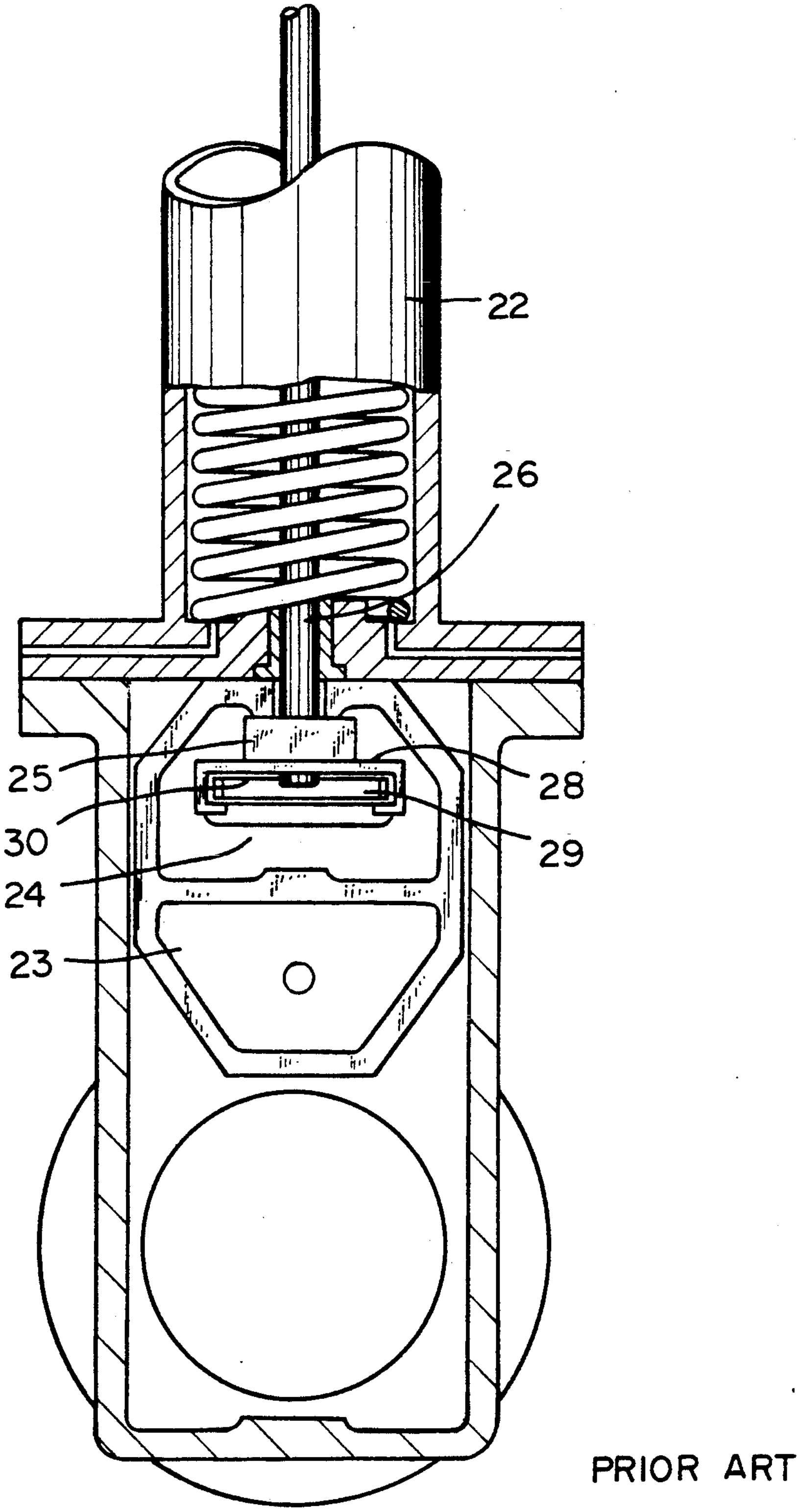
FIG. 3 is a partially cutaway plan view of the prior art sliding exhaust brake system.

Referring to FIGS. 1A, 1B, and 2, there is shown a sliding exhaust brake according to the invention. The body of the brake has a housing 1. Connecting walls 1' protrude from both ends of the housing 1. The connecting walls 1' are connected with an exhaust pipe (not shown). The housing 1 has an exhaust gas passage 2. A valve member 3 taking the form of a flat plate can move back and forth in a path which is in communication with the gas passage 2 and extends substantially at right angles to the passage 2. The valve member 3 engages a piston rod 6 extending through the partition wall of an air cylinder device 5 connected with the upper end of the path. A block member 9 which engages the side wall of the valve member 3 is fixed near the front end of the rod 6.

In FIG. 1A, an exhaust pressure-adjusting hole 7 extends through the bottom wall of the valve member 3 and is located on the side of the front end of the valve member 3. A piston valve mechanism 8 opens and closes the hole. An abutting rod 14 extends outwardly through the peripheral wall 15 of the valve member 3 located on the side of the front end. The piston valve mechanism 8 is mounted on the base of the abutting rod 14 located inside the peripheral wall 15. A support frame 12 of a C-shaped cross section is connected with the abutting rod 14 via another block member 16 which bears against the peripheral wall 15. A liner 11 is loosely inserted in the frame 12. The bottom surface of the liner 11 slides on the surface of the valve member while making intimate contact with it to open or close the exhaust pressure-adjusting hole.

A compression spring 13 is stretched between the back surface of the piston valve mechanism 8 and an intermediate beam of the valve member 3 to bias the piston valve mechanism 8 forward. When the exhaust gas passage 2 is closed by the valve member 3 that is driven by the piston valve mechanism 8, the exhaust pressure-adjusting hole 7 is opened. Under this condition, the piston valve mechanism 8 cooperates with the valve member 3 to close the passage 2. Meanwhile, some of the exhaust pressure-adjusting hole 7 is kept released from the exhaust pressure-adjusting hole 7 to suppress the rate at which the exhaust pressure is increased. When the front end of the abutting rod 14 bears against the bottom wall of the housing 1 as shown in FIG. 2 to completely close off the passage, the piston valve mechanism 8 moves rearward to close the exhaust pressure-adjusting hole 7. When the passage is opened, the block member 9 attached to the valve member 3 is brought into engagement with the valve member 3 prior to the rearward movement of the valve member 3 itself. Then, the piston valve mechanism 8 is moved slightly forward by the urging force of the spring 13. As shown in FIG. 2, the exhaust pressure-adjusting hole 7 is opened to permit some of the exhaust gas to escape from the adjusting hole 7. Thus, the exhaust pressure is effectively lowered. At the same time, the piston valve mechanism 8 cooperates with the valve member 3 to open the passage.

In the example shown in FIG. 1B, the exhaust pressure-adjusting hole 7 used in the previous example is employed as a second exhaust pressure-adjusting hole. This example is similar to the prior art structure in other respects. More specifically, in FIG. 1B, an auxiliary valve member 10 is added. This member 10 consists of a support frame 12 of a C-shaped cross section and a liner 11 sliding on the surface of the valve member 3 while making intimate contact with it, the valve member 3 being fitted in the frame. This frame 12 is mounted to the front surface of a block member 9 engaging the valve member 3 near the front end of the piston rod 6. An exhaust pressure-adjusting hole 4 separate from the aforementioned exhaust pressure-adjusting hole 7 is formed in the bottom wall of the valve member 3. When the exhaust gas passage 2 is closed off by the valve member 3, the exhaust pressure-adjusting hole 4 is closed by the auxiliary valve member 10.

In the example shown in FIG. 1B, when the exhaust gas passage 2 is closed by the valve member 3 driven by the piston valve mechanism 8, the exhaust pressure-adjusting hole 4 is closed by the auxiliary valve member 10, but the second exhaust pressure-adjusting hole 7 is kept open, because the piston valve mechanism 8 is retained in position by a tension spring 13 stretched between the support frame 12 and the peripheral wall 15. The piston valve mechanism cooperates with the valve member to close the exhaust gas passage 2. Meanwhile, some of the exhaust gas is kept released from the second exhaust pressure-adjusting hole 7 to suppress the rate at which the exhaust pressure increases during the operation. After the abutting rod 14 bears against the bottom wall of the housing 1 to completely close off the passage, the piston valve mechanism 8 moves rearward, thus closing the second exhaust pressure-adjusting hole 7. When the passage is opened, the exhaust pressure-adjusting hole 4 is opened by the auxiliary valve member 10 prior to rearward movement of the valve member 3 itself. Then, the piston valve mechanism 8 is moved forward slightly by the biasing force of the tension spring 13 in synchronism with the valve member 3. Thus, the second exhaust pressure-adjusting hole 7 is opened to release some of the exhaust gas from both adjusting holes 4 and 7. As a result, the passage is opened more effectively than in the previous example. A relief hole 17 is formed to prevent overload.

As described thus far, in the novel sliding exhaust brake system, the exhaust pressure-adjusting hole or the separate second exhaust pressure-adjusting hole 7 is formed in the valve member 3. The piston valve mechanism 8 is provided to open and close the exhaust pressure-adjusting hole 7. When the exhaust gas passage 2 is closed by the valve member 3, the piston valve mechanism 8 moves with the valve member 3 while opening the exhaust pressure-adjusting hole 7 by the piston mechanism 8. Meanwhile, some of the exhaust gas is kept released from the hole 7 to suppress the rate at which the exhaust pressure increases during the operation. Consequently, the exhaust gas passage 2 can be closed sufficiently smoothly and quickly without the need to make larger or more powerful the actuator such as the cylinder device 5 or the diaphragm device driving the valve or the whole assembly even if the exhaust gas pressure or the amount of the exhaust gas is increased because the output power of the engine is increased, the engine is supercharged to a greater extent, or it is rotated at higher speeds. Concomitantly, when the passage is opened, the second exhaust pressure-adjusting hole 7 that is formed in addition to the exhaust pressure-adjusting hole 4 as the need arises is opened. This hastens the operation further. The novel sliding exhaust brake system produces large braking force and provides quite high responsiveness. In this way, the novel sliding exhaust brake system is useful.

What is claimed is:

1. A sliding exhaust brake system having an exhaust gas passage, comprising:

a housing provided with a path extending substantially at right angles to the exhaust gas passage;

a main valve member defining a substantially flat plate, the main valve member being movable in said path into and out of the exhaust gas passage, the main valve member being provided with a first exhaust pressure-adjusting hole, the main valve member being mounted to a piston rod extending from an air cylinder device connected with the housing at an end of said path remote from the exhaust gas passage;

a block member engaged by the main valve member and being fixed to the piston rod, the piston rod pushing the main valve member in one direction for closing the exhaust gas passage and the block member engaging the main valve member to move the main valve member in the opposite direction for opening the exhaust gas passage;

a second exhaust pressure-adjusting hole formed at a front end of the main valve member remote from the piston rod;

an abutting rod having a front end portion extending outwardly through a peripheral wall of the main valve member located near the front end of the main valve member;

a piston valve mechanism that opens and closes the second exhaust pressure-adjusting hole and is mounted to the abutting rod; and a spring biasing the piston valve mechanism forward and into an open position.

2. The sliding exhaust brake system of claim 1, wherein said spring is a compression spring stretched between the piston valve mechanism and an intermediate beam of the main valve member.

3. A sliding exhaust brake system having an exhaust gas passage, comprising:

a housing provided with a path extending substantially at right angles to the exhaust gas passage;

a main valve member mounted in the housing and defining a substantially flat plate, the main valve member being movable in said path into and out of the exhaust gas passage, the main valve member being provided with a first exhaust pressure-adjusting hole, the main valve member engaging a piston rod extending from an air cylinder device connected to the housing at an end of said path remote from the exhaust gas passage;

an auxiliary valve member which, when the exhaust gas passage is closed by the main valve member, closes the first exhaust pressure-adjusting hole and which, when the exhaust gas passage is opened, opens the first exhaust pressure adjusting hole, the auxiliary valve member being held to the front end of the piston rod via a block member that is brought into engagement with the main valve member when the exhaust gas passage is opened;

a separate second exhaust pressure-adjusting hole formed at a front end of the main valve member;

an abutting rod having a front end portion extending outwardly through a peripheral wall of the main valve member located near the front end of the main valve member;

a piston valve mechanism that opens and closes the separate second exhaust pressure-adjusting hole, the piston valve mechanism being mounted to the abutting rod; and a spring biasing the piston valve mechanism forward and into an open position.

4. The sliding exhaust brake system of claim 3, wherein said piston valve mechanism comprises a support frame of a C-shaped cross section and a liner loosely inserted in the frame, and wherein said spring is a tension spring mounted between the support frame and the peripheral wall of the main valve member.

* * * * *